United States Patent
Thomas, Jr.

(10) Patent No.: US 10,240,847 B1
(45) Date of Patent: Mar. 26, 2019

(54) EFFICIENT ELECTRIC TRAILER REFRIGERATION SYSTEM

(71) Applicant: Robert P Thomas, Jr., Phoenix, AZ (US)

(72) Inventor: Robert P Thomas, Jr., Phoenix, AZ (US)

( * ) Notice: Subject to any disclaimer, the term of this patent is extended or adjusted under 35 U.S.C. 154(b) by 0 days.

(21) Appl. No.: 15/983,030

(22) Filed: May 17, 2018

Related U.S. Application Data (60) Provisional application No. 62/636,894, filed on Mar. 1, 2018, provisional application No. 62/613,203, filed on Jan. 3, 2018.

(51) Int. Cl.

| | |
|---|---|
| *F25D 11/00* | (2006.01) |
| *F25B 13/00* | (2006.01) |
| *F25B 49/02* | (2006.01) |
| *B60H 1/32* | (2006.01) |
| *F25B 27/00* | (2006.01) |
| *B60H 1/00* | (2006.01) |

(52) U.S. Cl.
CPC ....... *F25D 11/003* (2013.01); *B60H 1/00428* (2013.01); *B60H 1/3223* (2013.01); *F25B 13/00* (2013.01); *F25B 27/005* (2013.01); *F25B 49/022* (2013.01)

(58) Field of Classification Search
CPC . F25D 11/003; B60H 1/00428; B60H 1/3223; F25B 13/00; F25B 27/005; F25B 49/022
See application file for complete search history.

(56) References Cited

U.S. PATENT DOCUMENTS

| | | | |
|---|---|---|---|
| 6,157,175 A | 12/2000 | Morinigo et al. | |
| 6,700,214 B2 | 3/2004 | Ulinski et al. | |
| 6,796,367 B2 | 9/2004 | Blacquiere et al. | |
| 7,338,335 B1 | 3/2008 | Messano | |
| 7,600,595 B2 * | 10/2009 | Harris | B60K 6/32 180/65.28 |
| 7,673,466 B2 * | 3/2010 | Pacy | B60H 1/00428 62/236 |
| 8,295,950 B1 | 10/2012 | Wordsworth et al. | |

(Continued)

FOREIGN PATENT DOCUMENTS

EP    2773023 A1    3/2014

*Primary Examiner* — Marc E Norman
(74) *Attorney, Agent, or Firm* — Invention To Patent Services; Alex Hobson (57) ABSTRACT

A trailer refrigeration system incorporates a trailer refrigeration unit that is powered by multiple sources including a generator coupled to the truck, photovoltaic cells and a battery pack. The trailer refrigeration unit may be a conventional refrigerator having a compressor, an evaporator and a compressible refrigerant. The refrigeration unit may be powered by one or more electric motors, such as an axial flux or transverse flux motor that has high efficiency, high torque at low revolutions per minute (RPM). The refrigeration unit is powered at least in part by the generator when the truck is running below a threshold power level and may be powered by the battery pack and/or photovoltaic cells when the truck engine is not running or running above a threshold power level. A power management system including the battery management system is used to control the flow of power to the refrigeration unit and to and from the battery pack.

20 Claims, 9 Drawing Sheets

(56) References Cited

U.S. PATENT DOCUMENTS

| | | |
|---|---|---|
| 8,798,857 B2 * | 8/2014 | Waldschmidt ....... B60H 1/3222 |
| | | 701/36 |
| 8,935,933 B1 | 1/2015 | Koelsch |
| 2013/0000342 A1 | 1/2013 | Blasko et al. |
| 2014/0026599 A1 | 1/2014 | Busignuolo et al. |
| 2014/0283533 A1 | 9/2014 | Kurtzman et al. |
| 2015/0188323 A1 | 7/2015 | Mualidhar et al. |
| 2015/0246593 A1 | 9/2015 | Larson et al. |
| 2015/0316301 A1 | 11/2015 | Kolda et al. |

* cited by examiner

EFFICIENT ELECTRIC TRAILER REFRIGERATION SYSTEM

CROSS REFERENCE TO RELATED APPLICATIONS

This application claims the benefit of priority to U.S. provisional patent application No. 62/613,203, filed on Jan. 3, 2018, and U.S. provisional patent application No. 62/636,894, filed on Mar. 1, 2018, both entitled Electric Trailer Refrigeration Unit; the entirety of both are hereby incorporated by reference herein.

BACKGROUND OF THE INVENTION

Field of the Invention

The invention relates to an energy efficient and intelligent electric trailer refrigeration unit system that incorporates two separate motors for the compressor and air moving device, such as axial flux PM traction motors, and that utilizes electric power from a battery pack and an auxiliary power source which may be configured on the trailer or a tractor coupled to the trailer.

Background

Tractor trailers carry cargo that requires refrigeration. These units typically derive power from a small diesel engine generator that is separate from the tractor or truck and built into the refrigeration unit attached to the front of the trailer. This engine runs constantly and receives fuel from a fuel tank that is attached to the trailer. In addition, when the truck is parked for long periods of time, the temperature of the trailer may rise above a desired temperature which can affect the cargo. Furthermore, when the trailer is parked, the diesel engine generator must continue to run to keep the trailer cool or the trailer must receive power from an auxiliary power source, such as an electrical outlet, or a separate electrical generator that is separate from the trailer. Connecting and disconnecting power supply to the trailer can be difficult and leaves room for errors, wherein the cargo rises above an undesirable temperature. There exists a need for a trailer refrigeration system that can operate without the use of fossil fuel and can maintain temperature within the trailer for periods of time when the tractor is not connected. In a typical usage life of a refrigerated trailer, the trailer will sit in a yard waiting for its turn to be filled with items such as perishables. Refrigeration trailers preparing to be loaded need to have their diesel generators turned on a couple of hours before the unit is loaded to reach a desired temperature before the truck is attached and can being transport. This is not an efficient way to cool the trailer and diesel generators produce exhaust.

It is predicted that trucks, such as tractor-trailers, will move to alternative drive system, much like personal vehicles are moving to hybrid drive systems and all electric drive systems. Current trailer refrigeration systems may have a fuel source, such as diesel on the tractor-trailer. Many trailers have a fuel source on the trailer.

SUMMARY OF THE INVENTION

The invention is directed to an energy efficient trailer refrigeration unit system that may be powered by multiple sources including power sources be configured on the trailer, or power sources coupled to or part of the tractor, or truck. An exemplary trailer refrigeration system may receive power from sources only on the trailer, such as a generator, fuel cell, battery or photovoltaic cells. A battery pack may receive a charging power from an auxiliary power source such as an electrical generator, fuel cell, shore power or an outlet, or a photovoltaic cell. A battery management system may regulate the flow of power from the power sources to the battery pack, an intelligent controller area network (CAN) bus, components of the trailer refrigeration system such as the compressor motor and an air moving device motor. In an exemplary embodiment, the compressor motor and/or the air moving device motor can be operated at a power level that is required and is not simply turned on or off. This regulated speed and power level of the refrigeration unit motors enables a more efficient operation and saves power drain from the power sources and particularly from a battery pack. In an exemplary embodiment, a trailer refrigeration system receives power from an auxiliary source that is coupled with a tractor, including an electrical generator, a fuel cell, a battery pack or a photovoltaic cell. The power management system may regulate power from the auxiliary power source as required. In an exemplary embodiment, a generator, such as an axial flux generator is coupled to the truck Power Take Off (PTO) that is coupled with the truck engine by way of the transmission or flywheel of the engine, for example. An exemplary electrical generator coupled with the truck PTO is an axial flux PM traction generator or transverse flux generator. Electrical power produced by an auxiliary power source, such as a generator may be three phase, AC power that is regulated by the power management system. An exemplary power management system controls the flow of power from an auxiliary power source to the battery pack and/or to the refrigeration unit and may convert the power from AC to DC and may regulate the voltage as required. A power management system may be configured on the trailer and a portion or a separate tractor power management system may be configured on the tractor. The two power management systems, the trailer and tractor power management systems may communicate to efficiently refrigerate the trailer refrigeration unit.

In an exemplary embodiment, the trailer refrigeration unit (TRU) comprises an electric motor for the refrigerator, to power the compressor, fans, pumps and other components of the refrigerator. A TRU may comprise a second electric motor for an air moving device, such as a fan or blower to circulate air within the trailer. The two electric motors may be variable speed electric motors that can be operated at various speeds as required and the trailer power management system may control the speeds of these motors through the controllers to maintain a desired temperature within the trailer and to save power. For example, one or more of the electric motors may be operated at 800 RPM in a power efficient mode to maintain a temperature within the trailer and may accelerate operational speeds at sensor measured speeds up to as high as 3800 RPM when more refrigeration is required, such as when the trailer has been opened for a period of time.

The compressor motor and/or the air moving motor may be a motor that is energy efficient and capable of high torque output at low speeds or revolutions per minute (RPM). In addition, an electrical generator coupled with Power Take Off may also be energy efficient and efficiently produce electrical power at relatively low RPM. Examples of these type of motors include transverse flux and axial flux motors. Axial flux motors and generators are described in U.S. Pat. No. 8,791,616 to Jean Marc Canini, et al., and in European patent application no. 2,773,023A1 to Timothy Woolmer, et al., the entirety of both applications are hereby incorporated by reference herein. Transverse flux motors and generators are described in U.S. Pat. No. 9,236,773B2 to Electric Torque Machines; the entirety of which is hereby incorporated by reference herein.

A preferred generator is an axial flux PM generator that is efficient at low revolutions per minute, light in nature, and is able to be manufactured with different power levels in the same footprint of the motor size. Another type of generator that may be used is a three-phase motor, such as a traction motor, and in particular a axial flux PM traction generator. A traction motors may be a preferred motor as the voltage can vary to adjust to requirements of the system, including the speed of the vehicle or power demand from the system. A traction motor may be a Permanent Magnet Synchronous Motors (PSM) or an Asynchronous Motors (ASM). Permanent magnet is abbreviated PM herein.

The power generated by the generator may be supplied to a power main transformer as AC power. A CPU may monitor power to the trailer management system or power coming back from the trailer power management system. The trailer may have a separate power management system from the power management system of the tractor or truck. Photovoltaic cells and a high voltage battery pack, which may have a voltage of 200V or more, may provide power to components of the trailer and this electrical power may be supplied to a trailer battery management system. An exemplary trailer refrigeration unit comprise a conventional refrigerator having a compressor, an evaporator and a compressible refrigerant. The refrigeration unit may be powered by one or more electric motors, such as an axial flux or transverse flux motor that has high efficiency, high torque at low revolutions per minute (RPM). Axial flux and transverse flux motors produce high torque with minimal input current. They are very efficient, and the motor can be made lightweight and small in relation for the amount of power or torque produced. Another type of motor/generator that may be used is a three-phase traction motor. A traction motor may be a preferred motor as the voltage can vary to adjust to requirements of the system, including the speed of the compressor or power demand from the system. For example, a nominal output power from traction motor can range from 10 KW to a peak Power of 100 KW holding a peak efficiency of 96.5% with a max speed of 5000 RPM. An exemplary traction motor can be wound to the exact specs that the system demands. A traction motor may be a three-phase Permanent Magnet Synchronous Motors (PSM) or an Asynchronous Motors (ASM). The refrigeration unit is powered at least in part by the generator when the truck is running below a threshold power level and may be powered by the battery pack and/or photovoltaic cells when the truck engine is not running or running above a threshold power level. The exemplary trailer refrigeration system enables a trailer to be kept cool by the operation of the refrigeration unit when the truck is not running or disconnected for a duration of time and in some cases continuously when the battery pack has enough capacity to operate the refrigeration unit throughout the nighttime hours.

An exemplary trailer refrigeration system comprises a power management system comprising a battery management system that connects with a CAN bus that regulates and controls the power deliver to the refrigeration unit. The power management system or battery management system may comprise or couple with a charge controller to control the state of charge of the battery pack. The charge controller may be used to measure the state of charge of the battery pack and run diagnostics to ensure the battery pack or any individual battery in the pack is within a desired voltage range and not overcharged or undercharged. The battery pack may be charged by an auxiliary power source such as a photovoltaic cell, fuel cell, and/or an electrical generator. The power management system may also receive power from shore power or an auxiliary power source detached from the trailer or tractor. In an exemplary embodiment however, the auxiliary power source is configured on the trailer or the tractor. When the auxiliary power source is configured on the trailer, the trailer refrigeration unit may be capable of operating for long periods of time without any addition power source. For example, a battery pack configured on the trailer may be recharged by the auxiliary power source configured on the trailer.

In an exemplary embodiment, an auxiliary power source is configured on the tractor and power management system regulates the power provided from the tractor auxiliary power source to the refrigeration unit. An exemplary tractor auxiliary power source is an electrical generator. The power management system of the tractor may detect the power output of the truck engine and disconnect the electrical generator when the power output exceeds an upper threshold limit, such as when the truck is driving up a steep hill or when the battery pack system is at a full state of charge. For example, an electrical generator may be coupled with the truck engine through a PTO and when the truck exceeds an upper threshold power output level, the power management system may decouple or disengage the electrical generator from the tractor engine. A PTO may be physically disengaged from the engine or a controller may reduce the power generated by the generator, thereby reducing the strain on the engine making more power available for the tractor. When the tractor power output level drops below a re-engage threshold power level, the power management system may re-engage or couple the electrical generator with the truck engine, or increase the electrical power generated. For example, when a tractor is going up a hill, the upper threshold power level may be exceeded by the engine and when the tractor reaches the top of the hill, the power level of the engine may drop below the re-engaging threshold power level. The re-engaging threshold power level may be some percentage lower than the upper threshold power level to avoid rapid engaging and disengaging of the generator from the engine, and may be about 10% lower or more, about 20% lower or more, about 30% lower or more and any range between and including the values provided. Likewise, the power management system may decouple an electrical generator from the tractor engine when the refrigeration unit is receiving sufficient power from another power source such as a photovoltaic cell, or when the battery pack is above a threshold charge level. In this way, the system is energy efficient. The power management system may detect when the truck engine is turned off and may then provide electrical power to the refrigeration unit from another power source such as the battery pack and/or the photovoltaic cells, for example.

A user input device may be configured in the truck cabin to enable the driver to control the functions of the refrigeration system, such as turning it on and off, or setting the temperature within the trailer. In addition, the user input device within the truck may allow a driver to set a mode of operation, such as a hold mode, wherein the trailer will maintain a temperature of the trailer without the truck engine running. In addition, the controller may allow a driver to set what power source should be the preferred power source, such as the tractor generator or batteries. For example, a driver may switch to battery mode for powering the refrigeration unit when there is a large power demand on the truck engine, such as when going uphill. Decoupling the PTO from the engine or lowering the electrical power generated by the generator, would provide more power to the truck. In an exemplary embodiment, the trailer power management system is also comprised of at least one battery management system with at least one AC to DC converter and at least one DC to AC inverter or a combination DC to AC to DC. The power management system may also have an AC main transformer. The power management system may control all DC functions that are on the trailer or auxiliary DC power units. The controller in the power management of the trailer will communicate with the controller on the truck power management system when coupled together.

A controller area network (CAN) bus electronic system is a sophisticated electronic system that increase the productivity of the TRU system, diagnoses problems quickly and allows implement to communicate with the TRU system. A central processing unit (CPU) is the electronic circuitry within a computer that carries out the instructions of a computer program by performing basic arithmetic, logic, control and input/output (I/O) operations specified by the instruction or control program. A CPU and control program may be configured in the vehicle control unit "VCU" or the Intelligent, meaning programmable, CAN open bus design.

Portions of the trailer refrigeration unit and system can be coupled to a frame, such as the electrically powered first compressor, the evaporator, the first electric blower and the electrically controlled expansion valve as well as the power management system including a CAN bus, controllers and battery management system. The frame can be figured to integrate the battery pack system as well. The trailer refrigeration unit can be located underneath the box of the trailer instead of along the front of the trailer as is typical for conventional trailer refrigeration units configured on trailers. This under the trailer configuration provide a more central air flow design and distribution that may be more efficient and effective. The majority of the TRU components may be integrated underneath the trailer and integrated to the bottom of the box and the frame of the trailer. With the TRU configured under the trailer, air ducts can be more easily routed throughout the interior of the trailer. Also, removing the bulky TRU from the front of the trailer will allow for the trailer to be closer to the tractor for aero design for less drag on the tractor trailer.

An integrated system will encompass the same All electric components that are designed into the package unit. A multi speed compressor coupled to an axial flux traction motor, an evaporator that has an axial flux traction motor coupled to fan designed to blow air through a main trunk line that will send air through lateral trunk lines that can either flow air up walls, through the floor or both. A condenser with a 12 to 24 volt DC motor. An integrated battery pack system, a VCU with traction controllers, CAN bus and a Battery Management system. The complete system can be underneath including the electronically controlled expansion valve. Radiators for cooling the motors can be strategically places with air ducting right to the cooling vents. With these new design changes the trailer manufacturer is now able design a more aero dynamic side skirting that we see today. The TRU that will go underneath a trailer can be regulated through ducting design and fluid dynamics under the trailer can be controlled.

An exemplary trailer refrigeration system comprises an air deliver system that effectively produces a flow of chilled air throughout the trailer. In an exemplary embodiment, the air delivery system comprises a main plenum having a plurality of branches or air ducts that extend from the main plenum. In an exemplary embodiment, the main plenum is configured at least partially under the floor of the trailer and the air ducts extend from the main plenum up into the trailer, such as along the wall of the trailer and may have an outlet proximal the top of the trailer or near the ceiling of the trailer. An exemplary air deliver system may comprise a return plenum and the intake for the return plenum may be proximal the top of the trailer or near the ceiling, to remove the warmest air from the trailer for refrigeration.

A power source may comprise an Electrical Energy Storage Unit (EESU) based of an ultracapacitor architecture. An EESU may be a type of battery pack as described herein. An EESU is a solid state polymer capacitor for electricity storage. These device may stores more energy than lithium-ion batteries and at a lower cost than lead-acid batteries.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
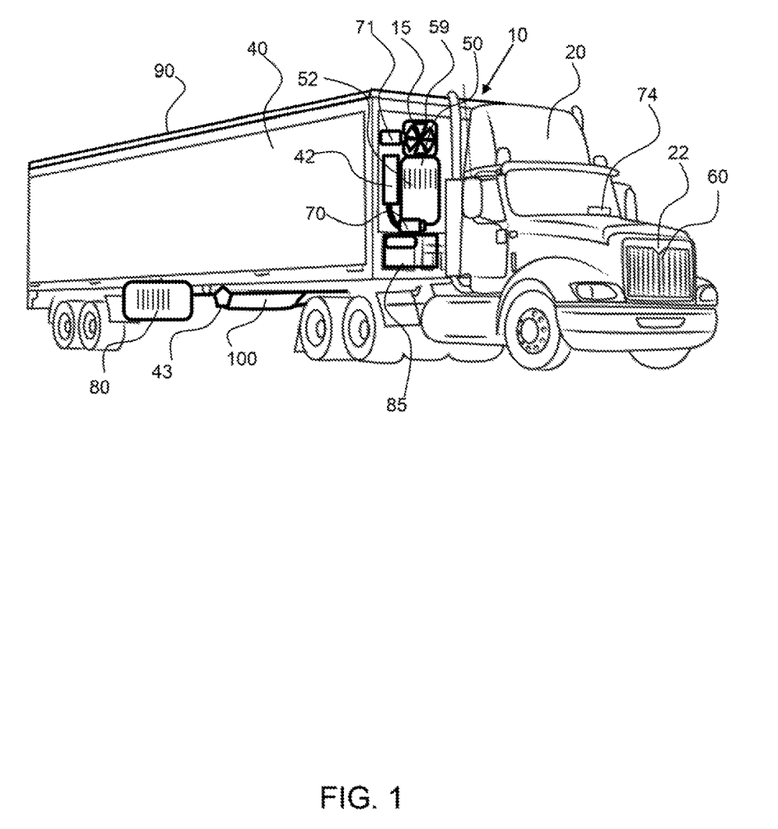
FIG. 1 shows a perspective view of a truck coupled to a trailer and an exemplary trailer refrigeration unit configured to cool the interior of the trailer.

As shown in FIG. 1, exemplary trailer refrigeration system 10 comprises a tractor 20 that is coupled to a trailer 40 and an exemplary trailer refrigeration unit 15 is configured to cool the interior of the trailer and comprises a refrigerator 50. The exemplary trailer refrigeration unit 15 comprises a compressor 52 and compressor motor 70 and an air moving device 59, such as a fan and an air moving motor 71 to power the air moving device. The exemplary trailer refrigeration unit 15 further comprises a power management system 42 and a battery management system 43 to control the flow of electrical power to the refrigeration unit. An exemplary trailer refrigeration unit receives power from an electrical generator 60 coupled to the truck engine 22 by a power take-off, and/or the photovoltaic cells 90 configured on the trailer, such as on the top of the trailer, and/or from a fuel cell 80 or a trailer electrical generator 85 configured on the trailer. The exemplary trailer refrigeration unit 15 receives refrigerates power from one or more of the power sources including the battery pack 100 and/or one of more of the auxiliary power sources including the photovoltaic cells 90, the tractor and/or trailer electrical generator, and the fuel cell. When the truck not running or is disconnected from the trailer, the power sources on the trailer may be used to power the refrigeration unit and/or charge the battery pack that provides power to the refrigeration unit. The photovoltaic cell may maintain the battery pack at a voltage when the tractor is not running, for example. A user input 74 may be configured in the cab of the tractor to enable the drive to control modes and functions of the trailer refrigeration unit, such as temperature of the refrigeration unit, primary power source for the refrigeration unit and the like, as described herein.

Figure 2:
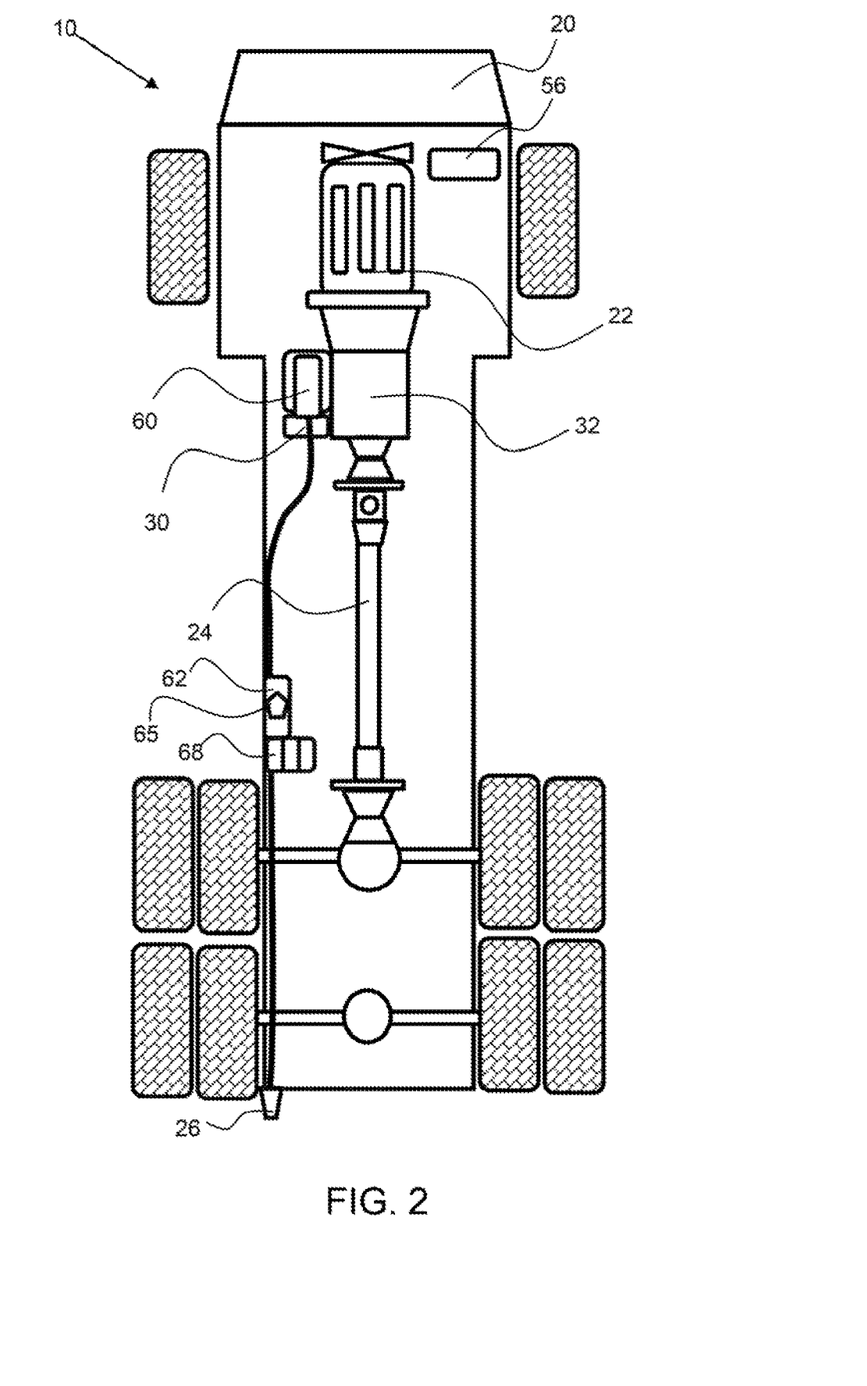
FIG. 2 shows a top view of the truck engine and drive train and a generator coupled to a power take-off.
Figure 3:
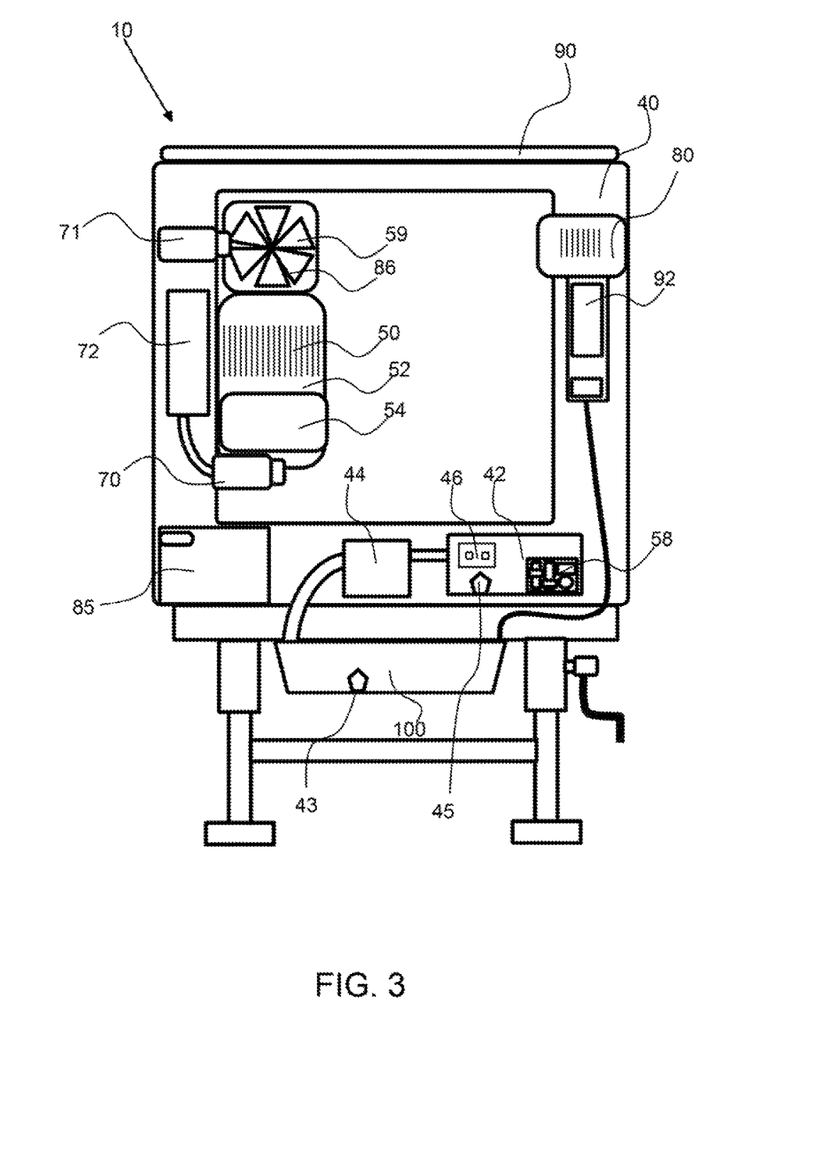
FIG. 3 shows an end view of a trailer having an exemplary trailer refrigeration unit comprising a refrigeration system, fan, photovoltaic cells, battery pack, a pair of electric motors to run the system and a battery pack to store power.

As shown in FIG. 2, an electrical generator 60 is coupled to the tractor 20 engine 22, by a power take-off 30 that may be coupled with the transmission 32. The generator may be an axial flux generator, or transverse flux generator, as described herein. The generator produces electrical power from the engine and supplies this power to the trailer refrigeration unit. The power may first be provided to a tractor power management system 62, having a controller 65 which may include a microprocessor. The power management system 62 is located on the tractor and a battery pack 68 may power the exemplary 12/24 volt power management system and any control systems located on the truck. A coupler 26 may be configured to plug into a trailer coupler 46, as shown in FIG. 3, to transfer power from the electrical generator to the refrigeration system which may utilize the power for running the refrigeration unit and/or charging the batteries. A tractor control system 56 controls some aspects of the trailer refrigeration unit and may operate automatically or manually. For example, when the truck is driving up hill and exceeds an upper threshold power level from the engine, the generator may be disconnected from the engine, by turning off the cogging torque, to reduce drag on the engine. When the truck reaches the top of the hill and is no longer under a large power demand, the power management system may automatically reengage the electrical generator with the tractor engine, when the tractor engine drops below a re-engaging threshold power level. The power management system of the tractor or trailer, may reconnect the generator to the power take off. In addition, a truck control system 56 may comprise a manual input for controlling the trailer refrigeration unit, wherein the unit can be turned on or off. For example, the trailer refrigeration unit may be turned on by the truck control system when the truck is initially connected to the trailer or turned off after a payload has been delivered and the trailer will be parked for a duration of time without the need of refrigeration. The truck control system may allow an input of a temperature within the trailer, wherein the trailer refrigeration unit will refrigerator and maintain a temperature in the trailer at or near the set temperature. The drive line 24 transfers power to the wheels of the truck.

As shown in FIG. 3, an exemplary trailer refrigeration system 10 comprises a trailer coupler 46 for receiving power and or communication signals, such as control signals from the truck power management system and truck control system respectively. The exemplary trailer refrigeration system 10 comprises a trailer refrigeration unit 15 comprising a refrigerator 50. The refrigerator may be a standard refrigerator comprising a compressor 52, evaporator 54, expansion valve and a flow of compressible refrigerant. An air moving device 59, such as a fan 86 may be coupled to the trailer 40 and/or refrigerator 50 to move air within the trailer. The exemplary refrigeration unit 15 may receive power from photovoltaic cells 90, a battery pack 100 and/or a trailer generator coupled 85 coupled to the trailer. As described herein, the refrigeration unit may also receive power from a power source coupled to a tractor though the trailer coupler 46, such as a tractor electrical generator coupled to the tractor engine by a PTO. The exemplary power management system 42 comprises a controller 45 and a battery management system 43. The power management system may control the flow of electrical power to the refrigerator and the electric motors of the trailer refrigeration unit 15. A CAN bus 58 may have a plurality of inputs and outputs and may interface with the power management system and battery management system to enable control of the temperature within the trailer and control the flow of power as required, in an efficient manner. A compressor motor 70 powers the compressor 52 and an air moving motor 71 powers the air moving device 59. A power converter/inverter 44 may be used to convert electric power from DC to AC, or from AC to DC power as required. A charge controller 92 may be coupled with the battery pack to control the state of charge of the battery pack, to avoid overcharging or undercharging of the batteries, which can harm the batteries as described herein. The battery pack may be charged by an auxiliary power source such as the photovoltaic cells 90 and/or the generator coupled to the trailer or tractor engine. The compressor motor 70, may be an axial flux motor. The air moving motor 71 may be an axial flux motor and may be coupled with a fan 86 or fans to circulate air within the trailer. These two motors, the compressor motor and air moving motor may be operated independently and at a power level required to conserve energy. A cooling system 72 may be used to keep the motor or motors cool during use. The trailer refrigeration system enables the trailer to be kept refrigerator for a duration of time when the truck engine is not running, such as up to four hours, up to six hours, up to ten hours, up to twelve hours, and continuously wherein the photovoltaic cells produce enough power to charge the battery pack, to power the refrigeration unit and charge the batteries for overnight periods.

Figure 4:
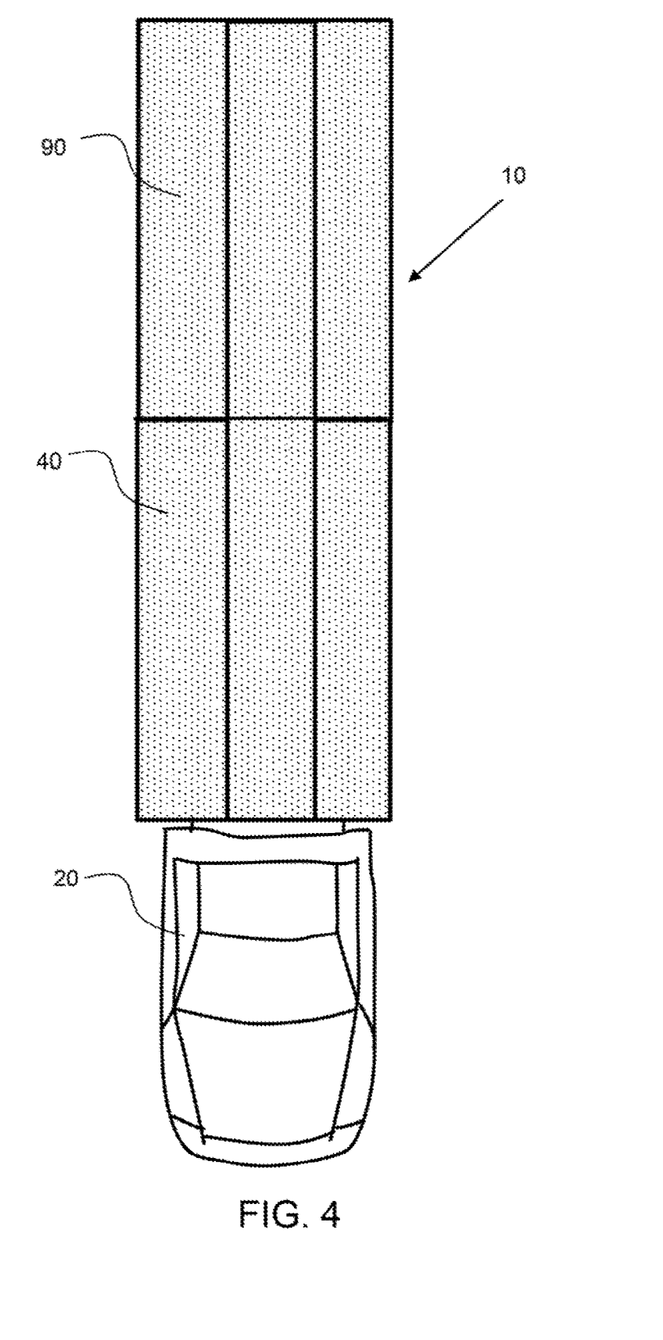
FIG. 4 shows a top view of an exemplary trailer refrigeration unit coupled to a trailer and comprising photovoltaic cells on the top of the trailer.

As shown in FIG. 4, an exemplary trailer refrigeration system 10 is coupled to a trailer 40 and comprises photovoltaic cells 90 on the top of the trailer. The photovoltaic cells may provide enough power to charge the battery pack to power the refrigeration unit and charge the batteries for overnight power demands.

Figure 5:
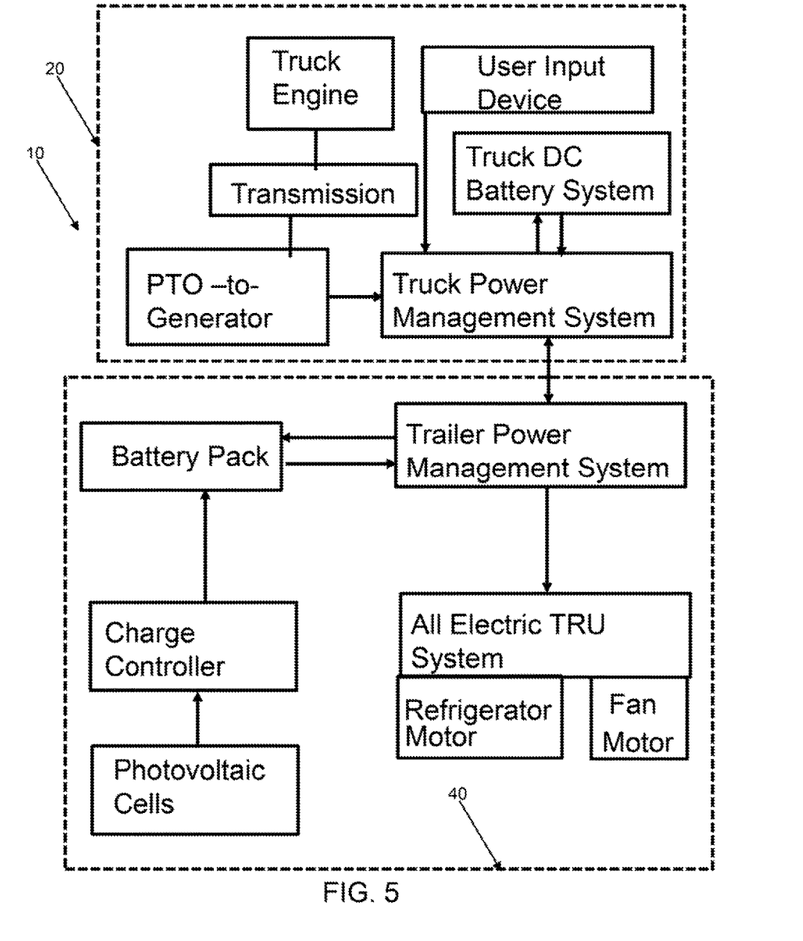
FIG. 5 shows a diagram of an exemplary trailer refrigeration system and the flow of power from the sources of power to the TRU.

As shown in FIG. 5, power is generated by the generator, such as an axial flux PM generator coupled to the truck engine by a PTO. The generated electrical power is transferred to the truck power management system. The truck power management system may then supply power to a battery pack or system located on the truck. A controller of the power management system may receive power from the truck battery pack. The truck power management system supplies power to the trailer management system through a coupler, as shown in FIGS. 2 and 3. The trailer power management system supplies power to the trailer refrigeration unit which may comprise an electric PM motor to run a refrigerator and an electric PM motor to run an air moving device, such as a fan. The trailer power management system receives power from the battery pack to run the TRU when the truck is not running. The battery pack may be charged by power produced by the photovoltaic cells through a charge controller and may also receive power for charging from the truck power management system. The exemplary trailer refrigeration system shown in all electric and does not require an auxiliary fossil fuel burning generator. The trailer may be kept cold when the truck is not engaged to the truck by power supplied by the battery pack and/or the photovoltaic cells.

Figure 6:
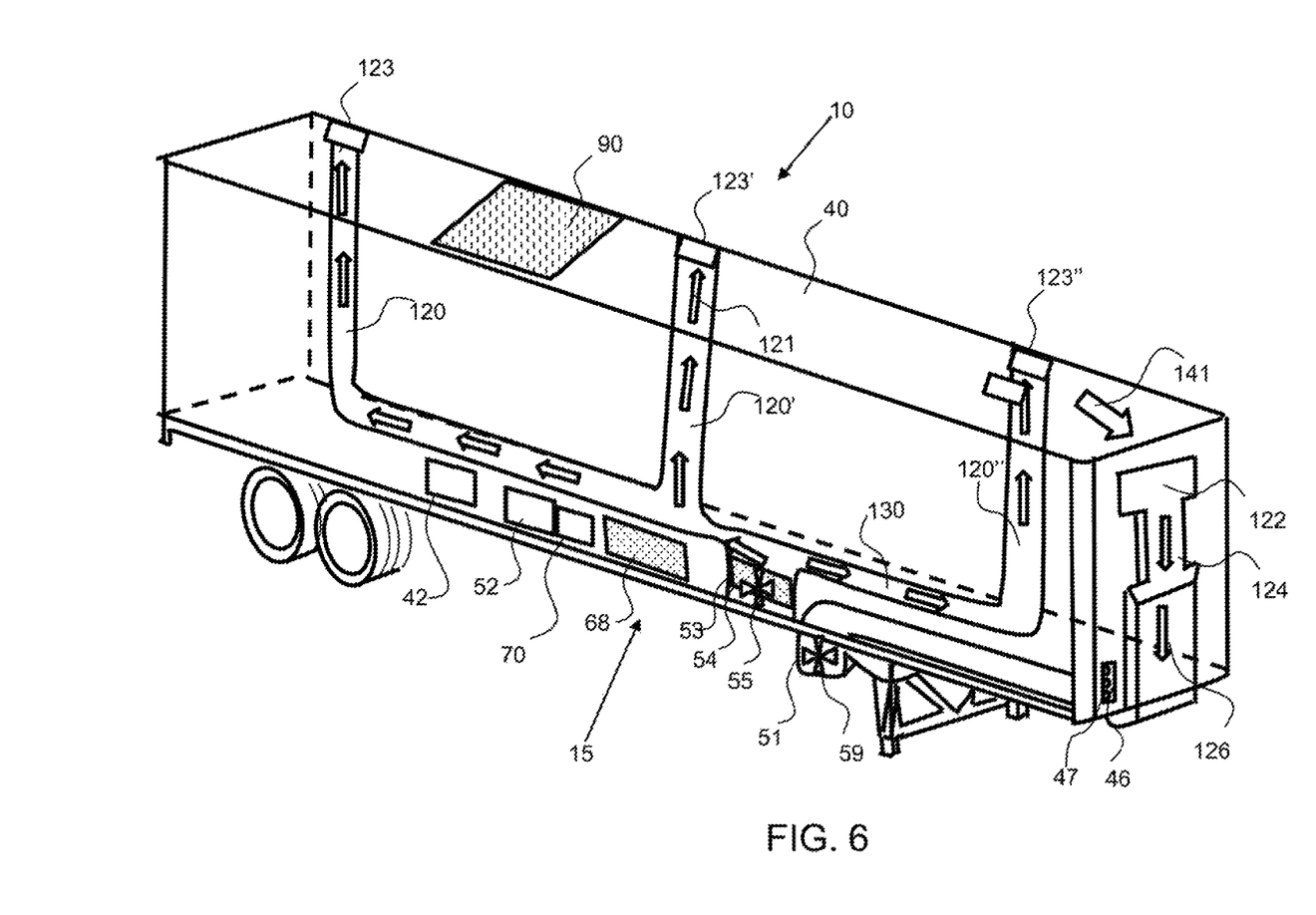
FIG. 6 shows a perspective view of an exemplary trailer refrigeration system.

FIG. 6 shows an exemplary trailer refrigeration system 10 comprising a trailer refrigeration unit (TRU) 15. The TRU is configured in the trailer 40 and comprises an air delivery system 119, that comprises a main plenum 130 and a plurality of air ducts 120-120" that extend from the main plenum for delivering refrigerated air 121 to the interior of the trailer. The air ducts 120-120" have air duct outlets 123-123" proximal to the top of the trailer. Delivering the refrigerated air near the top of the trailer may be a more efficient way to keep the trailer cool. Trailer air 141 enters the system through an intake 122 having a return plenum 124 to receive the return air 126. The intake air then flows through a refrigeration system comprising a compressor 52, condenser 51, evaporator 54, blower 55, and one or more air moving devices 59. An expansion valve 53 may be an electrically controlled expansion valve to control a refrigerant flow into the evaporator as a function of the compressor speed. A power management system 42 controls the functions of the TRU. A trailer coupler 46 may receive power and/or control commands from a control system configured on a truck. A three phase adapter 47 may be configured on the trailer. A battery pack 68 is configured on the trailer 40 to provide power to the TRU. A photovoltaic cell 90 is configured on the top of the trailer and may generate electrical power to recharge the battery pack. A motor 70, such as an electric traction motor may be used to drive the TRU 15. The TRU motor may be a permanent magnet synchronous motor (PSM) an asynchronous motor (ASM).

An exemplary trailer refrigeration unit (TRU) 15 may receive power from an auxiliary power source, such as from a power source coupled to or part of the tractor, not shown in FIG. 6. An auxiliary power source may be a power generator, such as a hydrogen power generator, a fuel cell, a battery or battery pack, or a power take off unit as described herein. The power from an auxiliary power source may be AC or DC power and may be 3-phase power. A power management system may convert or regulate the power from the power source or sources on the trailer and/or any auxiliary power sources to power the refrigeration system.

Figure 7:
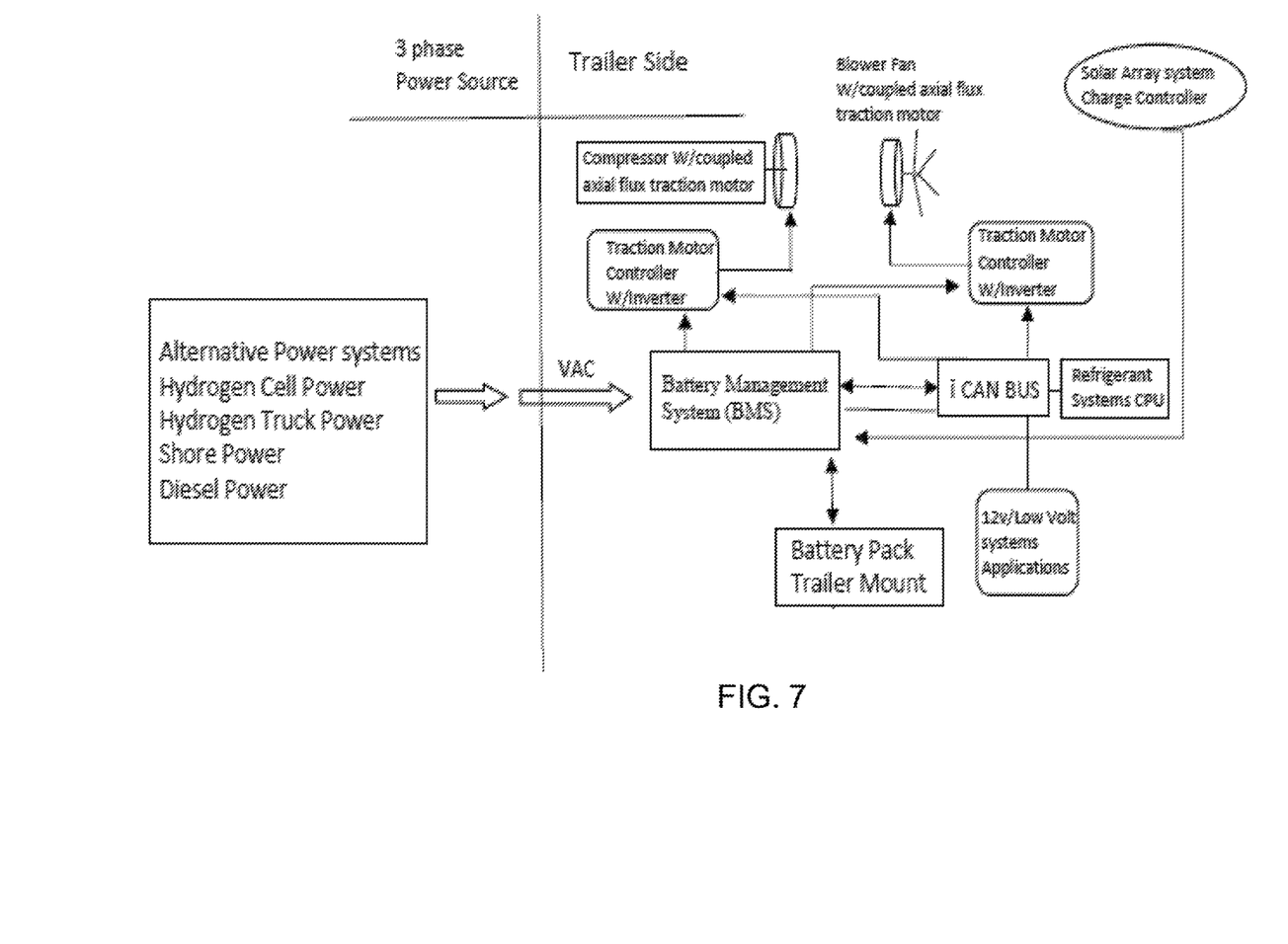
FIG. 7 shows a diagram of an exemplary trailer refrigeration system for a trailer that receives power from an alternative power system.

As shown in FIG. 7, an exemplary trailer refrigeration system for a trailer receives power from an alternative power system. The alternative power system may be a fuel cell, such as a polymer electrolyte membrane (PEM) fuel cell, from hydrogen truck power, from shore power and/or from diesel power. The electrical power from the alternative power system is provided to the battery management system which has a controller to determine where the power is distributed. This alternative power may be used to charge batteries, run fans, and/or run a compressor for the refrigeration unit(s).

Figure 8:
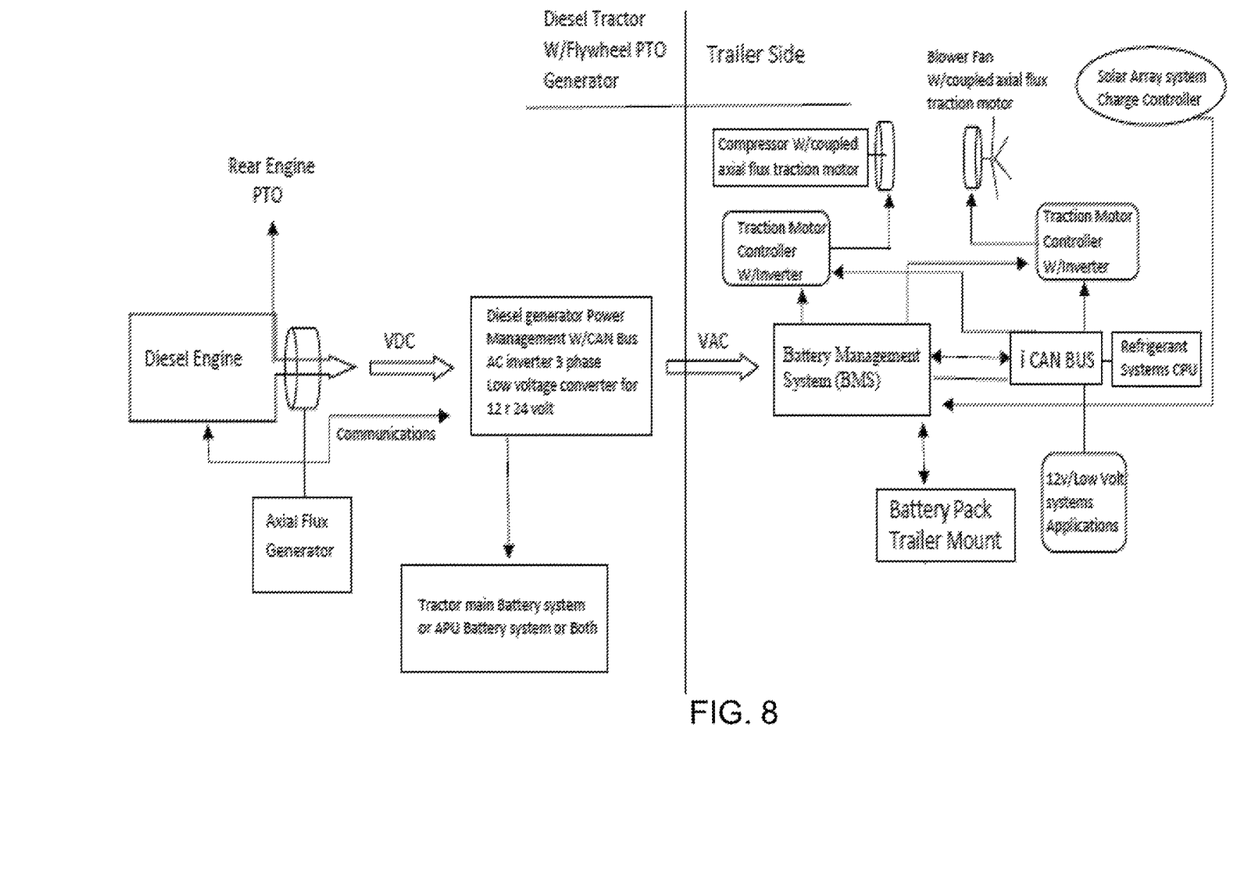
FIG. 8 shows a diagram of an exemplary trailer refrigeration system for a trailer that receives power from the tractor and wherein this power may be generated by an axial flux generator.

As shown in FIG. 8, an exemplary trailer refrigeration system for a trailer receives power from the tractor. Electrical power may be generated by an axial flux generator that is coupled with the diesel engine of the tractor. This power may be used to charge the tractor batteries, and or electrical devices of the tractor and at least a portion may be transferred to the trailer refrigeration system, such as being delivered to the battery management system, as shown. The electrical power from the tractor may distributed by the controller of the battery management system to charge batteries, run fans, and/or run a compressor for the refrigeration unit(s) on the trailer. The power generated on the tractor may be supplied to a tractor power management system (BMS) and distributed as required to components of the tractor and to components of the trailer.

Figure 9:
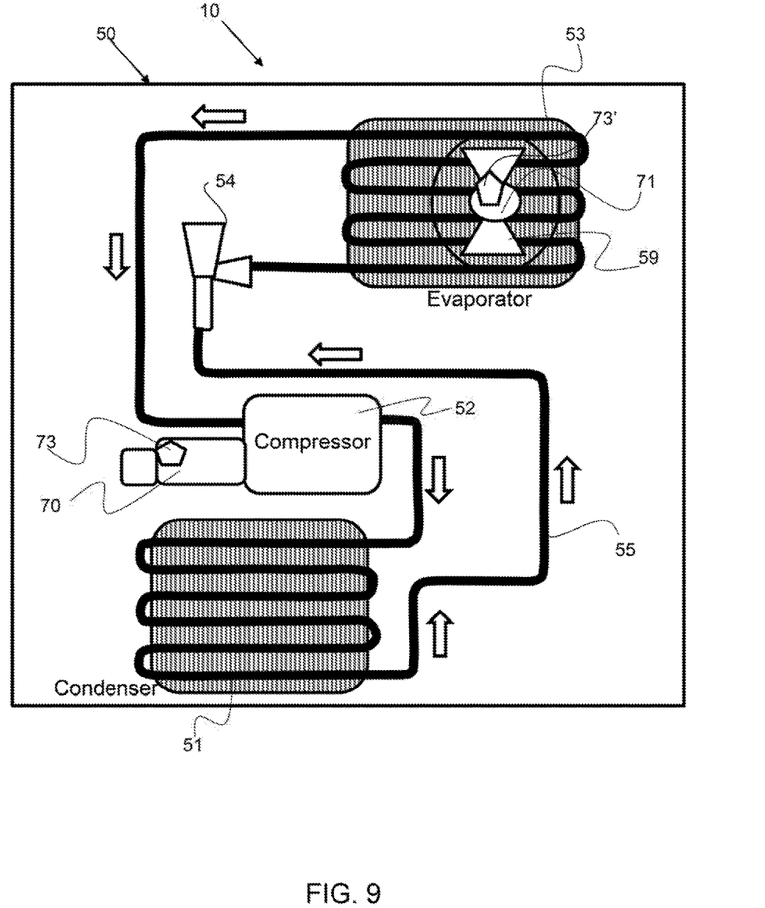
FIG. 9 shows a diagram of an exemplary refrigeration system.

As shown in FIG. 9, an trailer exemplary refrigeration system 10 comprises a refrigerator 50 comprising condenser 51, compressor 52, evaporator 53, expansion valve 54 and conduit 55 connecting the components. A refrigerant flows through the conduit from the condenser 51 to the expansion valve 54 where the refrigerant expand and flow through the evaporator 53 to provide cooling. The refrigerant then flows to the compressor 52 where it is compressed and sent back to the condenser 51. The compressor motor 70 interfaces with the compressor 52 to compress the refrigerant. An air moving device 59, such as a fan or blower, forces air over the evaporator and into the trailer to refrigerate the trailer. An air moving device motor 71 operates the air moving device. Each of the compressor motor 70 and air moving motor may be axial flux PM traction motor and a traction motor controller 73, 73' inverts electrical power from the battery pack and provides it to the compressor motor and air moving device motor. The traction motor controller also controls a voltage of the electrical power provided to each of the compressor motor and air moving device motor.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An energy efficient intelligent trailer refrigeration system for a trailer comprising:
 a) a trailer refrigeration unit comprising:
  i) an evaporator;
  ii) a condenser;
  iii) a compressor and a compressor motor to power said compressor;
  wherein the compressor motor is an axial flux permanent magnet traction motor;
  iv) an air moving device to circulate air across the evaporator and within trailer and having an air moving motor to power said air moving device;
   wherein the air moving motor is an axial flux permanent magnet traction motor;
 b) a trailer power source configured on the trailer to provide power to the trailer refrigeration unit including the compressor motor and the air moving motor;
  wherein the trailer power source comprises:
  i) a battery pack; and
 c) an auxiliary power source electrically coupled with the battery pack to provide a charging power to the battery pack;
 d) a power management system electrically coupled between the power source and the trailer refrigeration unit, wherein the power management system comprises:
  i) a controller comprising a microprocessor;
   wherein the controller controls the speed of the compressor motor and air moving motor to efficiently refrigerate the refrigeration unit;
  ii) a battery management system that comprises a charge controller coupled with the battery pack to control the state of charge of the battery pack to avoid overcharging or undercharging of the batteries;
   wherein the battery management system is coupled between said auxiliary power source and said battery pack and controls a charge level of the battery pack from said charging power from said auxiliary power source;
  iii) a CAN bus comprising:
   a plurality of inputs and outputs,
   a central processing unit configured to run a control program;
   wherein the CAN bus is coupled to the controller and the battery management system by said plurality of inputs and outputs and regulates power delivery to the refrigeration unit via said control program run by the central processing unit; and
  iv) a traction motor controller that inverts electrical power from the battery pack and provides it to the compressor motor and air moving device motor and also controls a voltage of said electrical power provided to each of the compressor motor and air moving device motor;
   wherein the CAN bus is programmable; and
   wherein the CAN bus receives input from the power source and from the refrigeration trailer refrigeration unit including from a temperature sensor that measures a temperature of the refrigeration unit.

2. The energy efficient intelligent trailer refrigeration system for a trailer of claim 1, wherein the auxiliary power source comprises a photovoltaic cell.

3. The energy efficient intelligent trailer refrigeration system for a trailer of claim 2, wherein the photovoltaic cell is configured on the trailer.

4. The energy efficient intelligent trailer refrigeration system for a trailer of claim 1, wherein the auxiliary power source comprises a fuel cell.

5. The energy efficient intelligent trailer refrigeration system for a trailer of claim 4, further comprising a tractor coupled to the trailer to transport the trailer and wherein the fuel cell is configured on said tractor.

6. The energy efficient intelligent trailer refrigeration system for a trailer of claim 5, wherein the tractor is a fuel cell propelled tractor propelled by said fuel cell.

7. The energy efficient intelligent trailer refrigeration system for a trailer of claim 1, wherein the auxiliary power source comprises a battery pack.

8. The energy efficient intelligent trailer refrigeration system for a trailer of claim 7, further comprising a tractor coupled to the trailer to transport the trailer and wherein the battery pack is configured on said tractor.

9. The energy efficient intelligent trailer refrigeration system for a trailer of claim 8, wherein the tractor is an electric tractor propelled by said battery pack.

10. The energy efficient intelligent trailer refrigeration system for a trailer of claim 1, wherein the auxiliary power source is an electrical generator and wherein the battery pack receives power from said electrical generator.

11. The energy efficient intelligent trailer refrigeration system of claim 10, wherein the electrical generator is an axial-flux PM permanent magnet generator.

12. The energy efficient intelligent trailer refrigeration system of claim 11, further comprising a tractor having a tractor engine, wherein the tractor is coupled to the trailer to transport the trailer; wherein the electrical generator is coupled to the tractor engine to generate electricity and wherein the power management system automatically disengages the electrical generator from the tractor engine when the tractor engine operates above an upper threshold power level.

13. The energy efficient intelligent trailer refrigeration system of claim 12, wherein the power management system automatically reengages the electrical generator with the tractor engine when the tractor engine drops below a re-engaging threshold power level.

14. The energy efficient intelligent trailer refrigeration system of claim 12, wherein the power management system disengages the electrical generator from the tractor engine when the battery pack is above an upper threshold charge level.

15. The energy efficient intelligent trailer refrigeration system of claim 14, further comprising a tractor battery pack that receives power from the electrical generator.

16. An energy efficient intelligent trailer refrigeration system for a trailer comprising:
 a) a trailer refrigeration unit comprising:
  i) an evaporator;
  ii) a condenser;
  iii) a compressor and a compressor motor to power said compressor;

wherein the compressor motor is an axial flux permanent magnet traction motor;
iv) an air moving device to circulate air across the evaporator and within trailer and having an air moving motor to power said air moving device;
wherein the air moving motor is an axial flux permanent magnet traction motor;
b) a tractor having a tractor engine, wherein the tractor is coupled to the trailer to transport the trailer;
wherein the tractor comprises an engine, and
c) a trailer power source configured on the trailer to provide power to the trailer refrigeration unit including the compressor motor and the air moving motor;
wherein the trailer power source comprises
i) a battery pack; and
d) an auxiliary power source electrically coupled with the battery pack to provide a charging power to the battery pack;
wherein the auxiliary power source comprises an electrical generator;
wherein the electrical generator is an axial-flux permanent magnet generator; and
wherein the electrical generator is configured on the tractor;
e) a power management system electrically coupled between the power source and the trailer refrigeration unit wherein the power management system comprises:
i) a controller comprising a microprocessor;
wherein the controller controls the speed of the compressor motor and air moving motor to efficiently refrigerate the refrigeration unit;
ii) a battery management system that comprises a charge controller coupled with the battery pack to control the state of charge of the battery pack to avoid overcharging or undercharging of the batteries;
wherein the battery management system is coupled between said auxiliary power source and said battery pack and controls a charge level of the battery pack from said charging power from said auxiliary power source;

iii) a Can bus that is coupled to the controller and the battery management system, said CAN bus comprising:
a plurality of inputs and outputs,
a central processing unit configured to run a control program;
wherein the CAN bus is coupled to the controller and the battery management system by said plurality of inputs and outputs and regulates power delivery to the refrigeration unit via said control program run by the central processing unit; and
iv) a traction motor controller that inverts electrical power from the battery pack and provides it to the compressor motor and air moving device motor and also controls a voltage of said electrical power provided to each of the compressor motor and air moving device motor;
wherein the CAN bus is programmable;
wherein the CAN bus receives input from the power source and from the trailer refrigeration unit including from a temperature sensor that measures a temperature of the refrigeration unit.

17. The energy efficient intelligent trailer refrigeration system of claim 16, wherein the electrical generator is coupled to the tractor engine to generate electricity; and wherein the power management system automatically disengages the electrical generator from the tractor engine when the tractor engine operates above an upper threshold power level.

18. The energy efficient intelligent trailer refrigeration system of claim 17, wherein the power management system automatically reengages the electrical generator with the tractor engine when the tractor engine drops below a re-engaging threshold power level.

19. The energy efficient intelligent trailer refrigeration system of claim 16, wherein the power management system disengages the electrical generator when the battery pack is above an upper threshold charge level.

20. The energy efficient trailer refrigeration unit system of claim 16, wherein the auxiliary power source comprises a photovoltaic cell is configured on the trailer.

* * * * *